(12) United States Patent
Andison et al.

(10) Patent No.: US 8,017,064 B2
(45) Date of Patent: *Sep. 13, 2011

(54) LIQUID OR HYDRAULIC BLOW MOLDING

(75) Inventors: David Andison, Oakville (CA); G. David Lisch, Jackson, MI (US); Dan Weissmann, Simsbury, CT (US); John Granata, Maumee, OH (US); Fred C. Beuerle, Jackson, MI (US)

(73) Assignee: Amcor Limited, Hawthorn, Victoria (AU)

( * ) Notice: Subject to any disclaimer, the term of this patent is extended or adjusted under 35 U.S.C. 154(b) by 70 days.

This patent is subject to a terminal disclaimer.

(21) Appl. No.: 12/328,578

(22) Filed: Dec. 4, 2008

(65) Prior Publication Data

US 2009/0218733 A1 Sep. 3, 2009

Related U.S. Application Data

(60) Provisional application No. 61/005,655, filed on Dec. 6, 2007.

(51) Int. Cl.
    B29C 49/00 (2006.01)
    B29C 49/12 (2006.01)
    B29C 49/64 (2006.01)

(52) U.S. Cl. ......... 264/524; 264/523; 264/529; 264/532

(58) Field of Classification Search ........................ None
    See application file for complete search history.

(56) References Cited

U.S. PATENT DOCUMENTS

| | | | |
|---|---|---|---|
| 3,267,185 | A | 8/1966 | Freeman, Jr. |
| 4,039,641 | A | 8/1977 | Collins |
| 4,321,938 | A | 3/1982 | Siller |
| 4,499,045 | A | 2/1985 | Obsomer |
| 4,539,172 | A | 9/1985 | Winchell et al. |
| 4,883,631 | A | 11/1989 | Ajmera |
| 4,935,190 | A | 6/1990 | Tennerstedt |
| 5,622,735 | A | 4/1997 | Krishnakumar et al. |
| 5,687,550 | A * | 11/1997 | Hansen et al. ........... 53/453 |
| 6,214,282 | B1 | 4/2001 | Katou et al. |
| 6,277,321 | B1 | 8/2001 | Vailliencourt et al. |
| 6,502,369 | B1 * | 1/2003 | Andison et al. ........... 53/432 |
| 6,692,684 | B1 | 2/2004 | Nantin et al. |
| 6,749,415 | B2 | 6/2004 | Boyd et al. |

(Continued)

FOREIGN PATENT DOCUMENTS

JP 63-249616 10/1988

(Continued)

*Primary Examiner* — Monica A Huson
(74) *Attorney, Agent, or Firm* — Harness, Dickey & Pierce, P.L.C.

(57) ABSTRACT

An apparatus and method for simultaneously forming and filling a plastic container is provided. A mold cavity defines an internal surface and is adapted to accept a preform. A pressure source includes an inlet and a piston-like device. The piston-like device is moveable in a first direction wherein liquid is drawn into the pressure source through the inlet and in a second direction wherein the liquid is urged toward the preform. A blow nozzle may be adapted to receive the liquid from the pressure source and transfer the liquid at high pressure into the preform thereby urging the preform to expand toward the internal surface of the mold cavity and creating a resultant container. The liquid remains within the container as an end product.

22 Claims, 4 Drawing Sheets

U.S. PATENT DOCUMENTS

| | | |
|---|---|---|
| 6,767,197 B2 | 7/2004 | Boyd et al. |
| 7,141,190 B2 | 11/2006 | Hekal |
| 2001/0010145 A1 | 8/2001 | Tawa et al. |
| 2005/0206045 A1 | 9/2005 | Desanaux et al. |

FOREIGN PATENT DOCUMENTS

| | | |
|---|---|---|
| WO | WO 02/24435 | 3/2002 |
| WO | WO 03/095179 | 11/2003 |
| WO | WO 2005/044540 | 5/2005 |

* cited by examiner

LIQUID OR HYDRAULIC BLOW MOLDING

CROSS-REFERENCE TO RELATED APPLICATIONS

This application claims the benefit of U.S. Provisional Application No. 61/005,655, filed on Dec. 6, 2007. The entire disclosure of the above application is incorporated herein by reference.

TECHNICAL FIELD

This disclosure generally relates to an apparatus and method for forming and filling a plastic container. More specifically, this disclosure relates to an apparatus and method for simultaneously forming and filling a plastic container.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container.

The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc). Once a container has been blown, a commodity may be filled into the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation.

SUMMARY

Accordingly, the present disclosure provides a system and method for using the final liquid product to impart the pressure required to expand a hot preform and to take on the shape of a mold thus simultaneously forming and filling the container.

In one example, the system includes a mold cavity defining an internal surface and adapted to accept a preform. The system also includes a pressure source having an inlet, a filling cylinder and a piston-like device. The piston-like device is moveable within the filling cylinder in a first direction such that liquid is drawn into the filling cylinder through the inlet and in a second direction such that the liquid is urged toward the preform. A blow nozzle may be adapted to receive the liquid from the pressure source and transfer the liquid at high pressure into the preform thereby urging the preform to expand toward the internal surface of the mold cavity and create a resultant container. The liquid remains within the container as an end commodity.

Additional benefits and advantages of the present disclosure will become apparent to those skilled in the art to which the present disclosure relates from the subsequent description and the appended claims, taken in conjunction with the accompanying drawings.

DETAILED DESCRIPTION

The following description is merely exemplary in nature, and is in no way intended to limit the disclosure or its application or uses.

Figure 6:
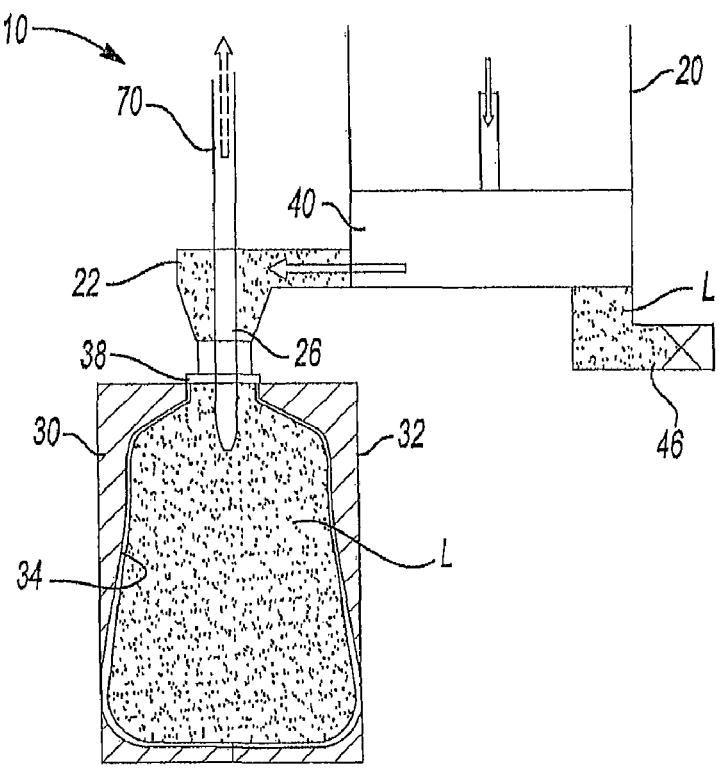
FIG. 6 is a schematic depiction of the system of FIG. 5 wherein the piston-like device has been fully actuated thereby completely transferring an appropriate volume of liquid to the newly formed container and wherein the stretch rod is withdrawing.
Figure 7:
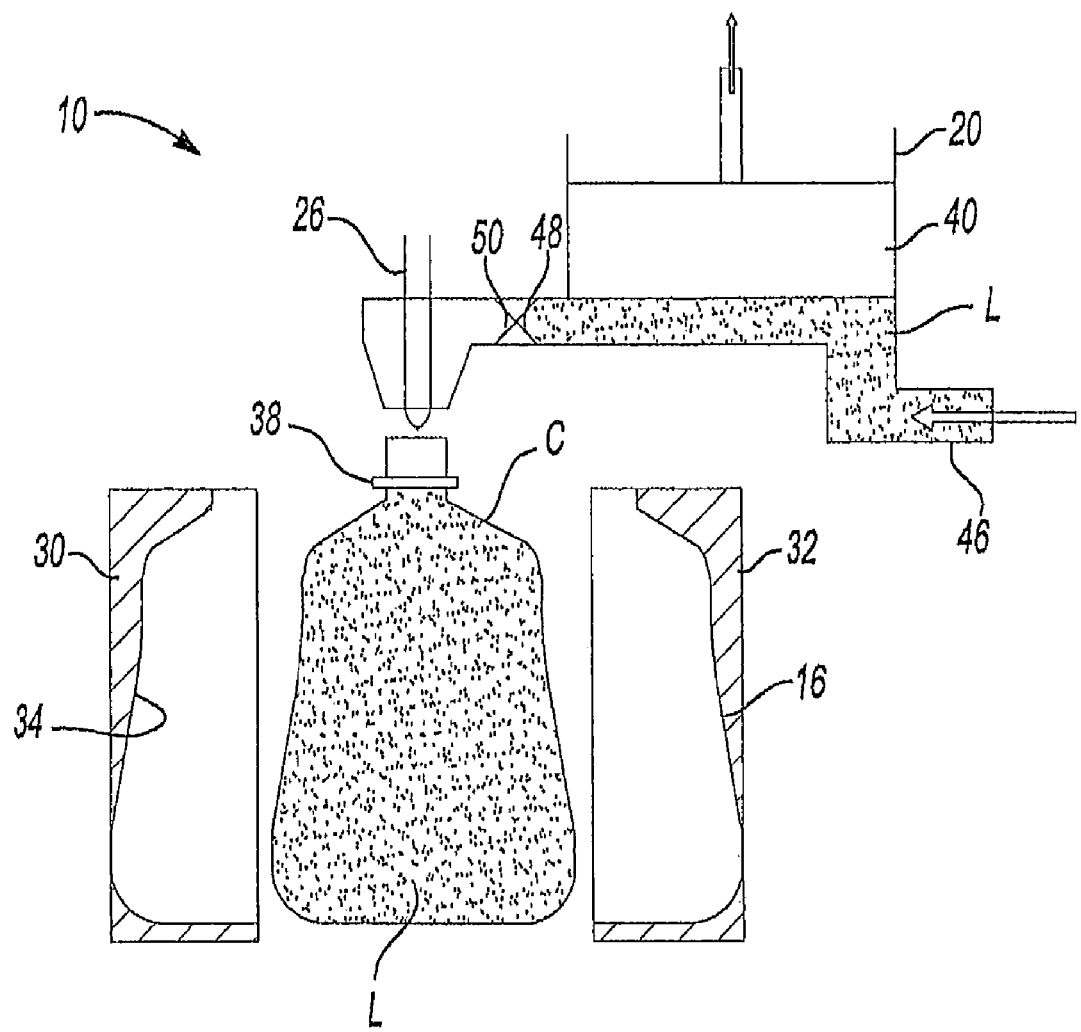
FIG. 7 is a schematic depiction of the system of FIG. 6 wherein the mold halves separate and the piston-like device begins to draw liquid into the pressure source in preparation for the next cycle.

With reference to all Figures, a mold station according to the present teachings is shown and generally referred to as reference numeral 10. FIGS. 1-7 show one exemplary sequence according to the present teachings. As will become appreciated from the following description, the mold station 10 and associated method utilize a final liquid commodity L to impart the pressure required to expand a hot preform 12 to take on the shape of a mold thus simultaneously forming and filling a resultant container C (FIG. 7).

Figure 1:
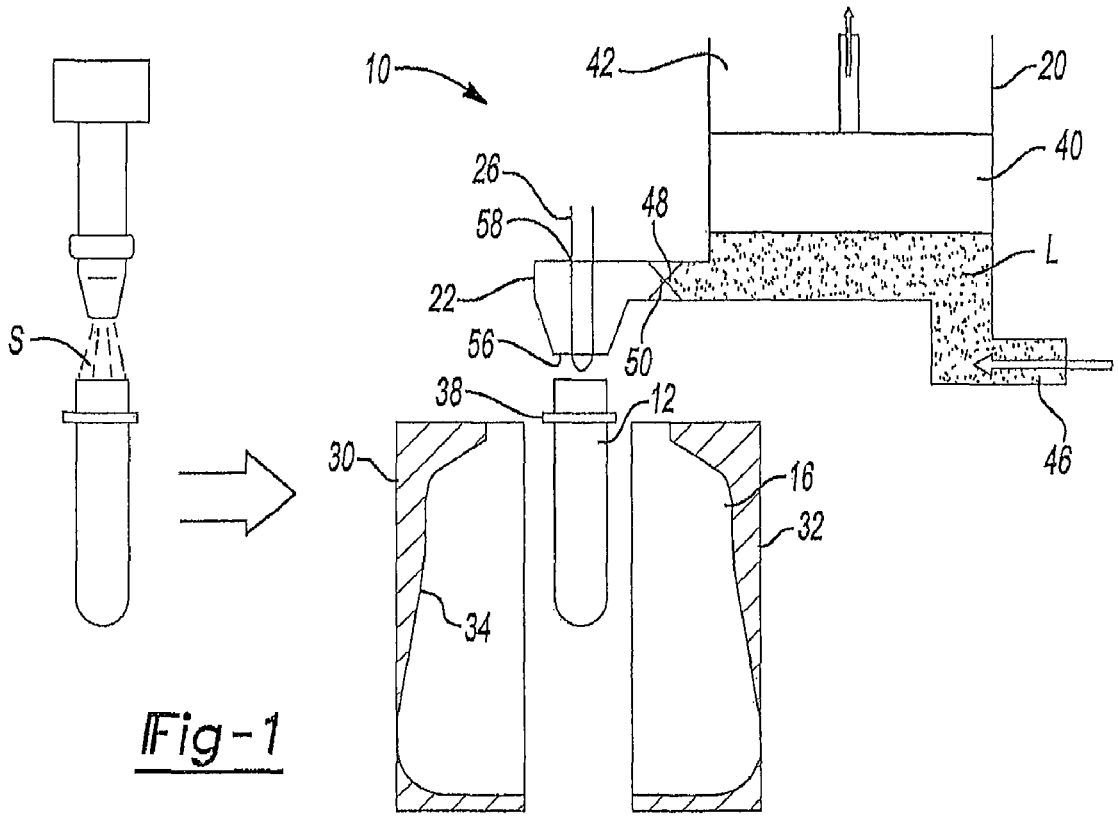
FIG. 1 is a schematic depiction of a heated preform passed into a mold station and being subject to an optional sterilization step, wherein a pressure source including a piston-like device begins to move upward, drawing liquid into the pressure source in accordance with the teachings of the present disclosure.

With initial reference to FIGS. 1 and 2, the mold station 10 will be described in greater detail. The mold station 10 generally includes a mold cavity 16, a pressure source 20, a blow nozzle 22 and a stretch rod 26. The exemplary mold cavity 16 illustrated includes mold halves 30, 32 that cooperate to define an interior surface 34 corresponding to a desired outer profile of a blown container. The mold cavity 16 may be moveable from an open position (FIG. 1) to a closed position (FIG. 2) such that a support ring 38 of the preform 12 is captured at an upper end of the mold cavity 16. The preform 12 may be formed of a polyester material, such as polyethylene terephthalate (PET), having a shape well known to those skilled in the art similar to a test-tube with a generally cylindrical cross section and a length typically approximately fifty percent (50%) that of the resultant container C height. The support ring 38 may be used to carry or orient the preform 12 through and at various stages of manufacture. For example, the preform 12 may be carried by the support ring 38, the support ring 38 may be used to aid in positioning the preform 12 in the mold cavity 16, or an end consumer may use the support ring 38 to carry the plastic container C once manufactured.

In one example, the pressure source 20 can be in the form of, but not limited to, a filling cylinder, manifold or chamber 42 that generally includes a mechanical piston-like device 40 including, but not limited to, a piston, a pump (such as a hydraulic pump) or any other such similarly suitable device, moveable within the filling cylinder, manifold or chamber 42. The pressure source 20 has an inlet 46 for accepting the liquid commodity L and an outlet 48 for delivering the liquid commodity L to the blow nozzle 22. It is appreciated that the inlet 46 and the outlet 48 may have valves incorporated thereat. The piston-like device 40 may be moveable in a first direction (upward as viewed in the FIGS.) to draw the liquid commodity L from the inlet 46 into the filling cylinder, manifold or chamber 42, and in a second direction (downward as viewed in the FIGS.) to deliver the liquid commodity L from the filling cylinder, manifold or chamber 42 to the blow nozzle 22. The piston-like device 40 can be moveable by any suitable method such as pneumatically, mechanically or hydraulically for example. The inlet 46 of the pressure source 20 may be connected, such as by tubing or piping to a reservoir or container (not shown) which contains the final liquid commodity L. It is appreciated that the pressure source 20 may be configured differently.

The blow nozzle 22 generally defines an inlet 50 for accepting the liquid commodity L from the outlet 48 of the pressure source 20 and an outlet 56 (FIG. 1) for delivering the liquid commodity L into the preform 12. It is appreciated that the outlet 56 may define a shape complementary to the preform 12 near the support ring 38 such that the blow nozzle 22 may easily mate with the preform 12 during the forming/filling process. In one example, the blow nozzle 22 may define an opening 58 for slidably accepting the stretch rod 26 used to initiate mechanical stretching of the preform 12.

In one example, the liquid commodity L may be introduced into the plastic container C during a thermal process, typically a hot-fill process. For hot-fill bottling applications, bottlers generally fill the plastic container C with a liquid or product at an elevated temperature between approximately 185° F. to 205° F. (approximately 85° C. to 96° C.) and seal the plastic container C with a closure (not illustrated) before cooling. In one configuration, the liquid may be continuously circulated within the filling cylinder, manifold or chamber 42 through the inlet 46 whereby the liquid can be heated to a preset temperature (i.e., at a heat source (not illustrated) upstream of the inlet 46). In addition, the plastic container C may be suitable for other high-temperature pasteurization or retort filling processes, or other thermal processes as well. In another example, the liquid commodity L may be introduced into the plastic container C under ambient or cold temperatures. Accordingly, by way of example, the plastic container C may be filled at ambient or cold temperatures such as between approximately 32° F. to 90° F. (approximately 0° C. to 32° C.), and more preferably at approximately 40° F. (approximately 4.4° C.). In examples where the liquid commodity is filled at ambient or cold temperatures, the preform may be subjected to a sterilization process before introducing the liquid commodity as will be described herein.

With reference now to all Figures, an exemplary method of simultaneously forming and filling the plastic container C will be described. According to one example (FIG. 1), steam S may be directed onto and/or into the preform 12 to partially or completely sterilize the preform 12. By subjecting the preform 12 to a sterilizing technique (such as steam S), an aseptic preform and resulting container can be created without requiring the end liquid to be the sterilizing medium. Therefore, the container need not be formed by a hot-filling process. It is appreciated that while steam S is shown in FIG. 1, other sterilizing mediums and/or techniques may be employed. In one example, the sterilizing medium may be a liquid such as, but not limited to, liquid peroxide.

Figure 2:
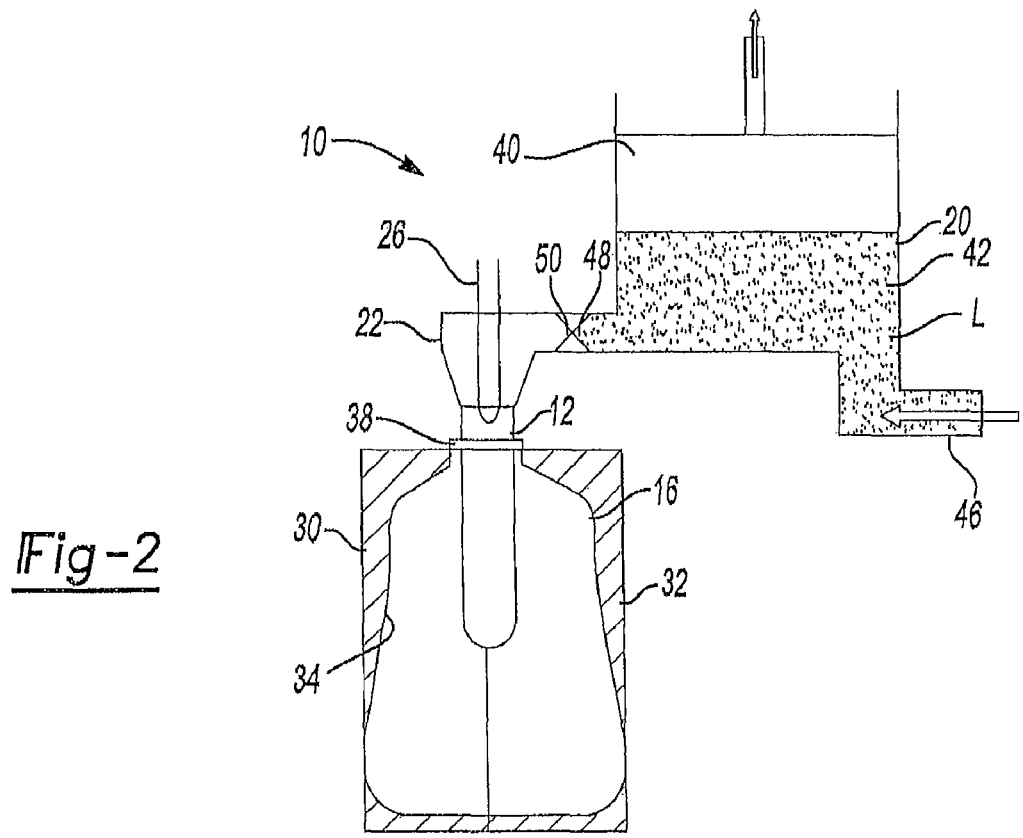
FIG. 2 is a schematic depiction of the system illustrated in FIG. 1 wherein the mold halves close around the preform and liquid continues to accumulate in the pressure source.

The preform 12 may be placed into the mold cavity 16 (FIG. 2). In one example, a machine (not illustrated) places the preform 12 heated to a temperature between approximately 190° F. to 250° F. (approximately 88° C. to 121° C.) into the mold cavity 16. As the preform 12 is located into the mold cavity 16, the piston-like device 40 of the pressure source 20 may begin to draw the liquid commodity L into the filling cylinder, manifold or chamber 42 through the inlet 46. The mold halves 30, 32 of the mold cavity 16 may then close thereby capturing the preform 12 (FIG. 2). The blow nozzle 22 may form a seal at a finish of the preform 12. The mold cavity 16 may be heated to a temperature between approximately 250° F. to 350° F. (approximately 93° C. to 177° C.) in order to impart increased crystallinity levels within the resultant container C. In another example, the mold cavity 16 may be provided at ambient or cold temperatures between approximately 32° F. to 90° F. (approximately 0° C. to 32° C.). The liquid commodity L may continue to be drawn into the filling cylinder, manifold or chamber 42 by the piston-like device 40.

Figure 3:
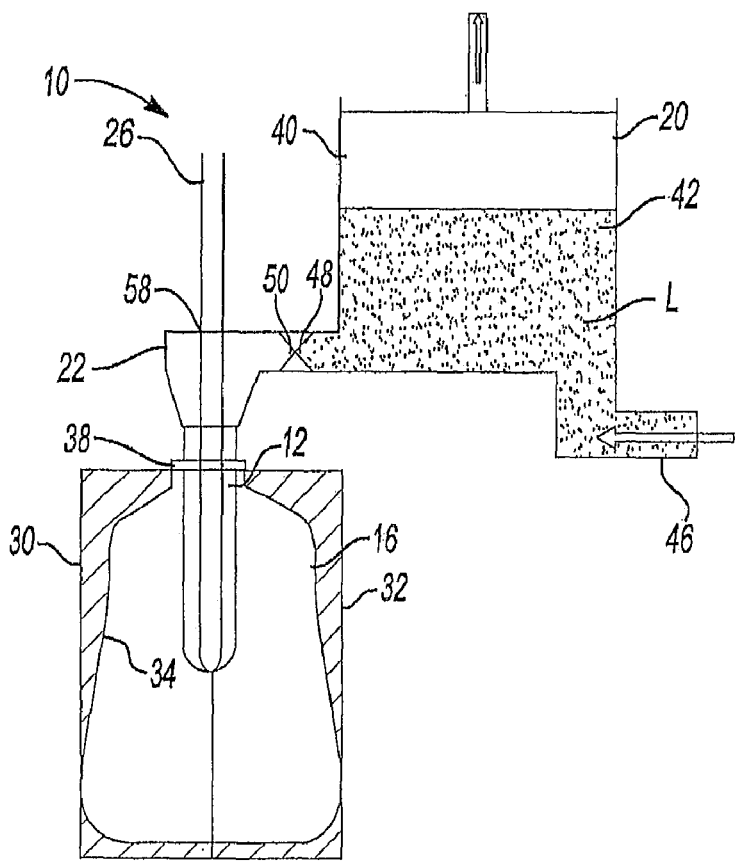
FIG. 3 is a schematic depiction of the system illustrated in FIG. 2 wherein a stretch rod extends into the preform to initiate mechanical stretching and wherein fluid continues to accumulate in the pressure source.
Figure 4:
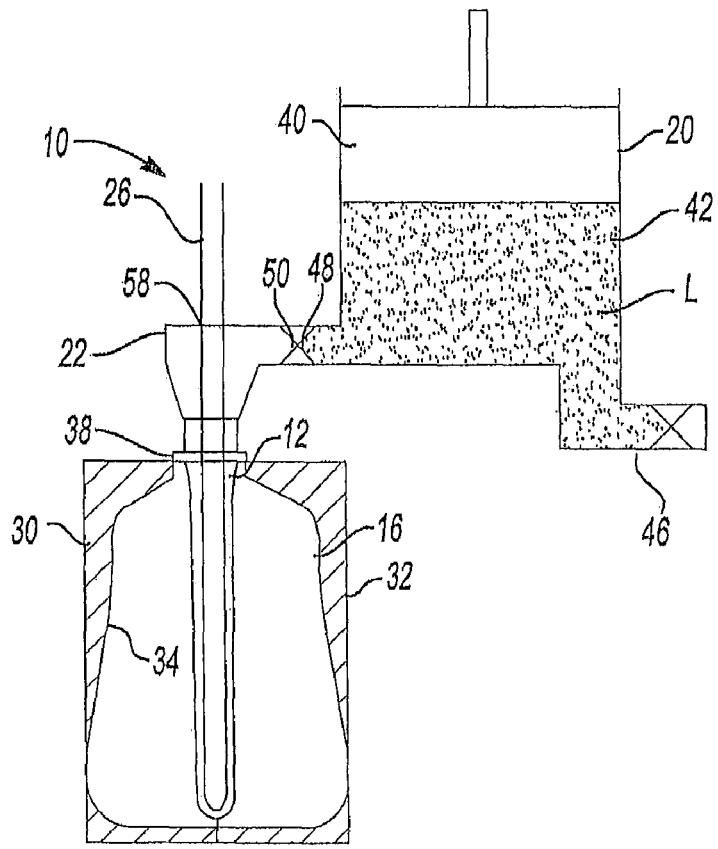
FIG. 4 is a schematic depiction of the system of FIG. 3 wherein the stretch rod stretches the preform and wherein fluid has been fully accumulated in the pressure source.

Turning now to FIG. 3, the stretch rod 26 may extend into the preform 12 to initiate mechanical stretching. At this point, the liquid commodity L may continue to be drawn into the filling cylinder, manifold or chamber 42. With reference to FIG. 4, the stretch rod 26 continues to stretch the preform 12 thereby thinning the sidewalls of the preform 12. The volume of the liquid commodity L in the filling cylinder, manifold or chamber 42 may increase until an appropriate volume suitable to form and fill the resultant container C is reached. At this point, a valve disposed at the inlet 46 of the pressure source 20 may be closed.

Figure 5:
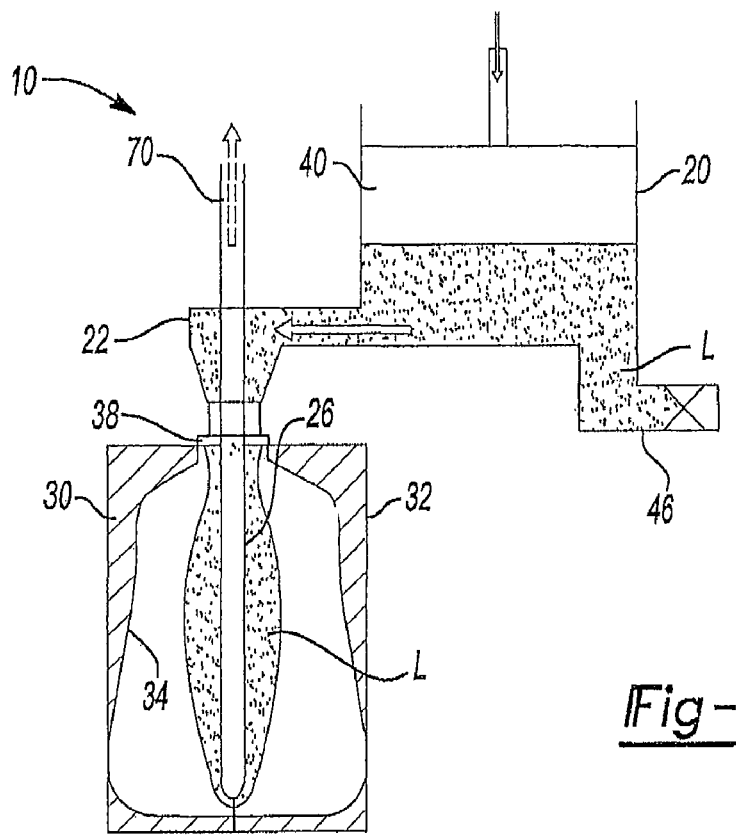
FIG. 5 is a schematic depiction of the system of FIG. 4 wherein the piston-like device drives the liquid from the pressure source to the preform thereby expanding the preform toward the walls of the mold cavity.

With specific reference to FIG. 5, the piston-like device 40 may then begin to drive downward (drive phase) to initiate the rapid transfer of the liquid commodity L from the filling cylinder, manifold or chamber 42 to the preform 12. Again, the piston-like device 40 may be actuated by any suitable means such as pneumatic, mechanical and/or hydraulic pressure. In one example, the hydraulic pressure within the preform 12 may reach between approximately 100 PSI to 600 PSI. The liquid commodity L causes the preform 12 to expand toward the interior surface 34 of the mold cavity 16. Residual air may be vented through a passage 70 defined in the stretch rod 26 (FIG. 5). As shown in FIG. 6, the piston-like device 40 has completed its drive phase thereby completely transferring the appropriate volume of the liquid commodity L to the newly formed plastic container C. Next, the stretch rod 26 may be withdrawn from the mold cavity 16 while continuing to vent residual air. The stretch rod 26 may be designed to displace a predetermined volume of the liquid commodity L when it is withdrawn from the mold cavity 16 thereby allowing for the desired fill level of the liquid commodity L within the resultant plastic container C. Generally, the desired fill level will correspond at or near the level of the support ring 38 of the plastic container C.

Alternatively, the liquid commodity L can be provided at a constant pressure or at different pressures during the molding cycle. For example, during axial stretching of the preform 12, the liquid commodity L may be provided at a pressure which is less than the pressure applied when the preform 12 is blown into substantial conformity with the interior surface 34 of the mold cavity 16 defining the final configuration of the plastic container C. This lower pressure $P_1$ may be ambient or greater than ambient but less than a subsequent high pressure $P_2$. The preform 12 is axially stretched in the mold cavity 16 to a length approximating the final length of the resultant plastic container C. During or just after stretching the preform 12, the preform 12 is generally expanded radially outward under the low pressure $P_1$. This low pressure $P_1$ is preferably in the range of between approximately 100 PSI to 150 PSI. Subsequently, the preform 12 is further expanded under the high pressure $P_2$ such that the preform 12 contacts the interior surface 34 of the mold halves 30, 32 thereby forming the resultant plastic container C. Preferably, the high pressure $P_2$ is in the range of approximately 500 PSI to 600 PSI. As a result of the above method, the base and contact ring of the resultant plastic container C is fully circumferentially formed.

Optionally, more than one piston-like device may be employed during the formation of the resultant plastic container C. For example, a primary piston-like device may be used to generate the low pressure $P_1$ to initially expand the preform 12 while a secondary piston-like device may be used to generate the subsequent high pressure $P_2$ to further expand the preform 12 such that the preform 12 contacts the interior surface 34 of the mold halves 30, 32 thereby forming the resultant plastic container C.

With reference to FIG. 7, the fill cycle is shown completed. The mold halves 30, 32 may separate and the blow nozzle 22 may be withdrawn. The resultant filled plastic container C is now ready for post-forming steps such as capping, labeling and packing. At this point, the piston-like device 40 may begin the next cycle by drawing the liquid commodity L through the inlet 46 of the pressure source 20 in preparation for the next fill/form cycle. While not specifically shown, it is appreciated that the mold station 10 may include a controller for communicating signals to the various components. In this way, components such as, but not limited to, the mold cavity 16, the blow nozzle 22, the stretch rod 26, the piston-like device 40 and various valves may operate according to a signal communicated by the controller. It is also contemplated that the controller may be utilized to adjust various parameters associated with these components according to a given application.

Some additional advantages realized by the present teachings will now be discussed further.

According to one advantage, some of the processing parameters can be lowered while still reaching desired results. For example, the requirements for preform conditioning can be reduced because the crystallinity requirements can be lowered. In addition, mold conditioning requirements can be reduced which can reduce the amount of oils and/or other surface preparation materials used on the interior surface 34 of the mold cavity 16.

According to one example, the integrated blowing and filling process described herein can be used to form containers having carbonated beverages (i.e., soda, etc.). In such an example, liquid carbon dioxide can be used in solution as part of, or in addition to, the liquid commodity during the simultaneous blowing and filling process. Liquid carbon dioxide prevents foaming that could otherwise occur when blowing with a liquid commodity having gaseous carbon dioxide. Carbon dioxide may exist in liquid form at a given pressure and temperature.

The combination of both the blow and filling processes into one piece of equipment (mold station 10) may reduce handling parts and therefore lead to reduced capital cost per resultant plastic container C. In addition, the space required by a process that simultaneously blows and fills the resultant plastic container C may be significantly reduced over the space required when the processes are separate. This may also result in lower infrastructure cost.

Integrating the two processes into a single step may reduce labor and additional costs (both capital and expense) associated with handling bottles after they are produced and before they are filled.

Integrating the blowing and filling processes into a single process eliminates the need to ship bottles. The shipping of bottles is inherently inefficient and expensive. Shipping preforms, on the other hand, is much more efficient. In one example, a trailer load of empty 500 ml water bottles contains approximately 100,000 individual bottles. The same size trailer loaded with preforms required to make 500 ml water bottles will carry approximately 1,000,000 individual preforms, a 10:1 improvement.

Compressed air is a notoriously inefficient means of transferring energy. Using the final product to provide hydraulic pressure to blow the container will require the equivalent of a positive displacement pump. As a result, it is a much more efficient way to transfer energy.

In the exemplary method described herein, the preforms may be passed through an oven in excess of 212° F. (100° C.) and immediately filled and capped. In this way, the opportunity for an empty container to be exposed to the environment where it might become contaminated is greatly reduced. As a result, the cost and complexity of aseptic filling may be greatly reduced.

In some instances where products are hot filled, the package must be designed to accommodate the elevated temperature that it is exposed to during filling and the resultant internal vacuum it is exposed to as a result of the product cooling. A design that accommodates such conditions may require added container weight. Liquid/hydraulic blow molding offers the potential of eliminating the hot fill process and as a result, lowering the package weight.

The process described herein may eliminate intermediary work in process and therefore may avoid the cost associated with warehousing and/or container silos and/or forklifts and/or product damage, etc. In addition, without work in process inventory, the overall working capital may be reduced.

As blowing and filling are integrated closer but remain as two separate processes (such as conventional methods of forming and subsequently filling), the overall efficiency of such a system is the product of the individual efficiencies of the two parts. The individual efficiencies may be driven largely by the number of transitions as parts move through the machines. Integrating the two processes into one may provide the opportunity to minimize the number of transitions and therefore increase the overall process efficiency.

Many beverages, including juices, teas, beer, etc., are sensitive to oxygen and need to be protected when packaged. Many plastics do not have sufficient barrier characteristics to protect the contents from oxygen during the life of the packaged product. There are a number of techniques used to impart additional barrier properties to the container to slow down oxygen transmission and therefore protect the packaged contents. One of the most common techniques is to use an oxygen scavenger in the container wall. Such a scavenger may be molded directly into the preform. The relatively thick wall of the preform protects the scavenger from being consumed prior to blowing it into a container. However, once the container has been blown, the surface area of the wall increases and the thickness decreases. As such, the path that the oxygen has to travel to contact and react with the active scavenging material is much shorter. Significant consumption of oxygen scavengers may begin as soon as the container is blown. If the container is formed and filled at the same time, then the scavenger is protecting the product through its entire useful life and not being consumed while the container sits empty waiting to be filled.

The method described herein may be particularly useful for filling applications such as isotonic, juice, tea and other commodities that are susceptible to biological contamination. In particular, by optionally sterilizing the preform as described above, an aseptic preform and resulting container can be created without requiring the end liquid to be the sterilizing medium. These commodities are typically filled in a controlled, sterile environment. Commercially, two ways are typically used to achieve the required sterile environment. In Europe, one primary method for filling these types of beverages is in an aseptic filling environment. The filling operation is performed in a clean room. All of the components of the product including the packaging must be sterilized prior to filling. Once filled, the product may be sealed until it is consumed preventing any potential for the introduction of bacteria. The process is expensive to install and operate. As well as, there is always the risk of a bacterial contaminant breaking through the operational defenses and contaminating the product.

In North America, one predominant method for filling contaminant susceptible beverages is through hot filling. In this process, the beverage is introduced to the container at a temperature that will kill any bacteria that is present. The container may be sealed while the product is hot. One drawback to this technology is that the containers usually need to be heavy to sustain the elevated filling temperature and the vacuum that eventually develops in the container as the product cools. As well as, the blow process is somewhat more complex and therefore more costly than non-heat set blow molding. The disclosure described herein offers the opportunity to dramatically reduce the cost and complexity of filling sensitive foods and beverages. By combining the blowing and filling processes, there is an ability to heat the preform to over 212° F. (100° C.) for a sufficient period of time necessary to kill any biological contaminants. If a sterile product is used as the container-forming medium and then immediately sealed, the process may result in a very inexpensive aseptic filling process with very little opportunity for contamination.

The concurrent blowing and filling process described herein can also facilitate the formation of a super-lightweight container. As noted above, in traditional hot-fill containers, the container usually needed to have a suitable wall thickness to accommodate vacuum pressures. By sterilizing the preform 12 (i.e. such as by subjecting it to steam S, FIG. 1) prior to introducing the liquid commodity, the resultant wall thickness can be much thinner relative to a traditional hot-filled container. In a super-lightweight container, the liquid itself can give structural support to the container. The walls of a super-lightweight container can therefore be extremely flexible.

There are many other bottled products where this technology may be applicable. Consumable products such as dairy products, liquor, salad dressings, sauces, spreads, ketchups, syrups, edible oils, and others may be bottled utilizing such methods. Furthermore, the term liquid commodity L used herein can also include non-consumable goods such as household cleaners, detergents, personal care items such as toothpaste, etc. Many of these products are currently found in blow molded PET containers but are also in extrusion molded plastic containers, glass bottles and/or cans. This technology has the potential of dramatically changing the economics of package manufacture and filling.

While much of the description has focused on the production of PET containers, it is contemplated that other polyolefin materials (e.g., polyethylene, polypropylene, polyester, etc.) as well as a number of other plastics may be processed using the teachings discussed herein.

While the above description constitutes the present disclosure, it will be appreciated that the disclosure is susceptible to modification, variation and change without departing from the proper scope and fair meaning of the accompanying claims.

What is claimed is:

1. A method of simultaneously forming and filling a container comprising:
    locating a preform in a mold cavity having an internal surface;
    sealably connecting a blow nozzle onto an opening of the preform;
    accumulating liquid into a chamber; and
    delivering the liquid from the chamber, through the blow nozzle into the opening of the preform thereby urging the preform to expand toward the internal surface of the mold cavity and create a resultant container, wherein the liquid remains within the container as an end product.

2. The method of simultaneously forming and filling a container of claim 1 wherein delivering the liquid from the chamber includes transferring the liquid into the preform at a temperature between approximately 185° F. (85° C.) and approximately 205° F. (96° C.).

3. The. method of simultaneously forming and filling a container of claim 1, further comprising sterilizing the preform prior to delivering the liquid into the preform, wherein delivering the liquid from the chamber includes transferring the liquid into the preform at an ambient temperature.

4. The method of simultaneously forming and filling a container of claim 1 wherein delivering the liquid from the chamber includes transferring the liquid into the preform at a temperature between approximately 32° F. (0° C.) and approximately 90° F. (32° C.).

5. The method of simultaneously forming and filing a container of claim 1 wherein delivering the liquid from the chamber includes transferring the liquid into the preform, wherein the preform is heated to a temperature between approximately 190° F. (88° C.) and approximately 250° F. (121° C.).

6. The method of simultaneously forming and filling a container of claim 1 wherein locating the preform in the mold cavity includes locating the preform in a mold cavity that is heated to a temperature between approximately 250° F. (93° C.) and approximately 350° F. (177° C.).

7. The method of simultaneously forming and filling a container of claim 1 wherein delivering the liquid from the chamber includes transferring the liquid into the preform at a pressure between approximately 100 PSI and approximately 600 PSI.

8. The method of simultaneously forming and filling a container of claim 1, further comprising advancing a stretch rod into the preform thereby mechanically stretching the preform prior to the liquid being urged into the preform.

9. The method of simultaneously forming and filling a container of claim 8 wherein advancing the stretch rod into the preform includes venting residual air in the preform through a passage defined in the stretch rod.

10. The method of simultaneously forming and filling a container of claim 7 wherein delivering the liquid from the chamber comprises:
   initially transferring the liquid at a first pressure; and
   subsequently transferring the liquid at a second pressure, the second pressure being greater than the first pressure.

11. The method of simultaneously forming and filling a container of claim 10 wherein the first pressure is between approximately 100 PSI and approximately 150 PSI, and the second pressure is between approximately 500 PSI and approximately 600 PSI.

12. The method of simultaneously forming and filling a container of claim 11 wherein the first pressure is generated from a first piston-like device and the second pressure is generated from a second piston-like device.

13. The method of simultaneously forming and filling a container of claim 1 wherein delivering the liquid from the chamber includes mechanically actuating a member to thereby deliver the liquid from the chamber.

14. A method of simultaneously forming and filling a container comprising:
   locating a preform in a mold cavity having an internal surface;
   sealably connecting a blow nozzle onto an opening of the preform;
   accumulating liquid into a chamber;
   sterilizing the preform prior to delivering the liquid into the preform; and
   mechanically actuating a member thereby delivering the liquid from the chamber, through the blow nozzle into the opening of the preform thereby urging the preform to expand toward the internal surface of the mold cavity and create a resultant container, wherein the liquid remains within the container as an end product.

15. The method of simultaneously forming and filling a container of claim 14 wherein delivering the liquid from the chamber includes transferring the liquid into the preform at an ambient temperature.

16. The method of simultaneously forming and filling a container of claim 14 wherein delivering the liquid from the chamber includes transferring the liquid into the preform at a temperature between approximately 32° F. (0° C.) and approximately 90° F. (32° C.).

17. The method of simultaneously forming and filling a container of claim 14 wherein locating the preform in the mold cavity includes locating the preform in a mold cavity that is heated to a temperature between approximately 250° F. (93° C.) and approximately 350° F. (177° C.).

18. The method of simultaneously forming and filling a container of claim 14 wherein delivering the liquid from the chamber includes transferring the liquid into the preform at a pressure between approximately 100 PSI and approximately 600 PSI.

19. The method of simultaneously forming and filling a container of claim 18 wherein delivering the liquid from the chamber comprises:
   initially transferring the liquid at a first pressure; and
   subsequently transferring the liquid at a second pressure, the second pressure being greater than the first pressure.

20. The method of simultaneously forming and filling a container of claim 19 wherein the first pressure is between approximately 100 PSI and approximately 150 PSI, and the second pressure is between approximately 500 PSI and approximately 600 PSI.

21. The method of simultaneously forming and filling a container of claim 20 wherein the first pressure is generated from a first piston-like device and the second pressure is generated from a second piston-like device.

22. A method of simultaneously forming and filling a container comprising:
   locating a preform in a mold cavity having an internal surface;
   sealably connecting a blow nozzle onto an opening of the preform;
   accumulating liquid into a chamber;
   sterilizing the preform prior to delivering the liquid into the preform;
   delivering the liquid from the chamber, through the blow nozzle into the opening of the preform thereby urging the preform to expand toward the internal surface of the mold cavity and create a resultant container, wherein the liquid remains within the container as an end product; and
   wherein delivering the liquid from the chamber includes transferring the liquid into the preform at a first pressure and subsequently transferring the liquid into the preform at a second pressure, the second pressure being greater than the first pressure, the first pressure and the second pressure being between approximately 100 PSI and 600 PSI.

* * * * *

UNITED STATES PATENT AND TRADEMARK OFFICE
CERTIFICATE OF CORRECTION

PATENT NO. : 8,017,064 B2  
APPLICATION NO. : 12/328578  
DATED : September 13, 2011  
INVENTOR(S) : David Andison et al.

Page 1 of 1

It is certified that error appears in the above-identified patent and that said Letters Patent is hereby corrected as shown below:

Column 9, lines 1-2, Claim 6, "(9320 C.)" should be --(93° C.)--.

Column 10, line 4, Claim 16, "3220 F." should be --32° F--.

Signed and Sealed this  
Thirty-first Day of January, 2012

David J. Kappos  
*Director of the United States Patent and Trademark Office*